United States Patent
Schoepf et al.

[11] Patent Number: 6,137,997
[45] Date of Patent: Oct. 24, 2000

[54] CIRCUIT FOR RECEIVING AND TRANSMITTING SIGNALS AND METHOD

[75] Inventors: K. Juergen Schoepf; David Kevin Lovelace, both of Chandler; Klaas Wortel, Phoenix; Jeffrey C. Durec, Chandler, all of Ariz.

[73] Assignee: Motorola, Inc., Schaumburg, Ill.

[21] Appl. No.: 09/128,428

[22] Filed: Aug. 4, 1998

[51] Int. Cl.[7] .................................................. H04B 1/40
[52] U.S. Cl. ............................ 455/86; 455/82; 455/76; 375/344; 375/219
[58] Field of Search ........................... 455/86, 85, 84, 455/82, 76, 83; 375/344, 296, 219, 332, 316

[56] References Cited

U.S. PATENT DOCUMENTS

| | | | |
|---|---|---|---|
| 5,001,776 | 3/1991 | Clark | 455/226 |
| 5,142,551 | 8/1992 | Borth et al. | 375/219 |
| 5,355,524 | 10/1994 | Higgins, Jr. | 455/82 |
| 5,493,583 | 2/1996 | Cripps | 379/219 |
| 5,734,970 | 3/1998 | Saito | 455/76 |
| 5,977,835 | 11/1999 | Huang | 330/305 |
| 5,987,074 | 11/1999 | Wakamatsu | 375/332 |
| 5,991,605 | 11/1999 | Rapeli | 455/76 |

*Primary Examiner*—Fan Tsang
*Assistant Examiner*—Isaak R. Jama
*Attorney, Agent, or Firm*—Anthony M. Martinez

[57] ABSTRACT

A circuit (30) and method for translating a spectrum of a modulated signal. The circuit (30) includes a mixer (33), a summing device (36), and a synthesizer (37). The circuit (30) receives and transmits modulated Radio Frequency (RF) signals. The synthesizer (37) generates a transmitter modulated RF signal ($TX_{RF}$) using a modulating signal ($TX_{MOD}$). The mixer (33) generates an intermediate frequency signal (IF) by mixing a receiver modulated RF signal ($RX_{RF}$) with the transmitter modulated RF signal ($TX_{RF}$). The summing device (36) removes modulation of the transmitter modulated RF signal ($TX_{RF}$) by combining the intermediate frequency signal (IF) with the modulating signal ($TX_{MOD}$).

5 Claims, 2 Drawing Sheets

US 6,137,997

CIRCUIT FOR RECEIVING AND TRANSMITTING SIGNALS AND METHOD

FIELD OF THE INVENTION

The present invention relates, in general, to circuits and, more particularly, to transceiver circuits.

BACKGROUND OF THE INVENTION

Transceiver circuits are used in wireless communication applications such as cellular telephones, cordless telephones, and pagers. A transceiver has a receiver portion which receives modulated Radio Frequency (RF) signals and a transmitter portion which transmits modulated RF signals. The receiver portion receives a modulated RF signal and translates this signal to a lower Intermediate Frequency (IF) signal for demodulation. Typically, the received modulated RF signal is mixed with a Local Oscillator (LO) signal to generate the IF signal. The LO signal is a pure tone or unmodulated signal. The receiver portion includes an oscillator for generating the pure tone signal. In addition, a second oscillator is used in the transmitter portion for generating a modulated RF signal at a desired carrier frequency.

Because each transceiver has two oscillators, they typically occupy a large area and require complex circuitry. Due to RF interference, it is difficult to integrate two oscillators onto one integrated circuit. In addition, having two oscillators increases the amount of power consumed during normal operation compared to having one oscillator.

Accordingly, it would be advantageous to have a circuit for receiving and transmitting modulated RF signals which uses a single oscillator. It would be of further advantage for the circuit to be area and cost efficient.

DETAILED DESCRIPTION OF THE DRAWINGS

Generally, the present invention provides a circuit for receiving and transmitting modulated Radio Frequency (RF) signals. The circuit, also referred to as a transceiver, uses one oscillator for receiving and transmitting the modulated RF signals. In addition, the present invention provides a method for translating a spectrum of a modulated RF signal from a first frequency to a second frequency by mixing the modulated RF signal with another modulated RF signal.

Figure 1:
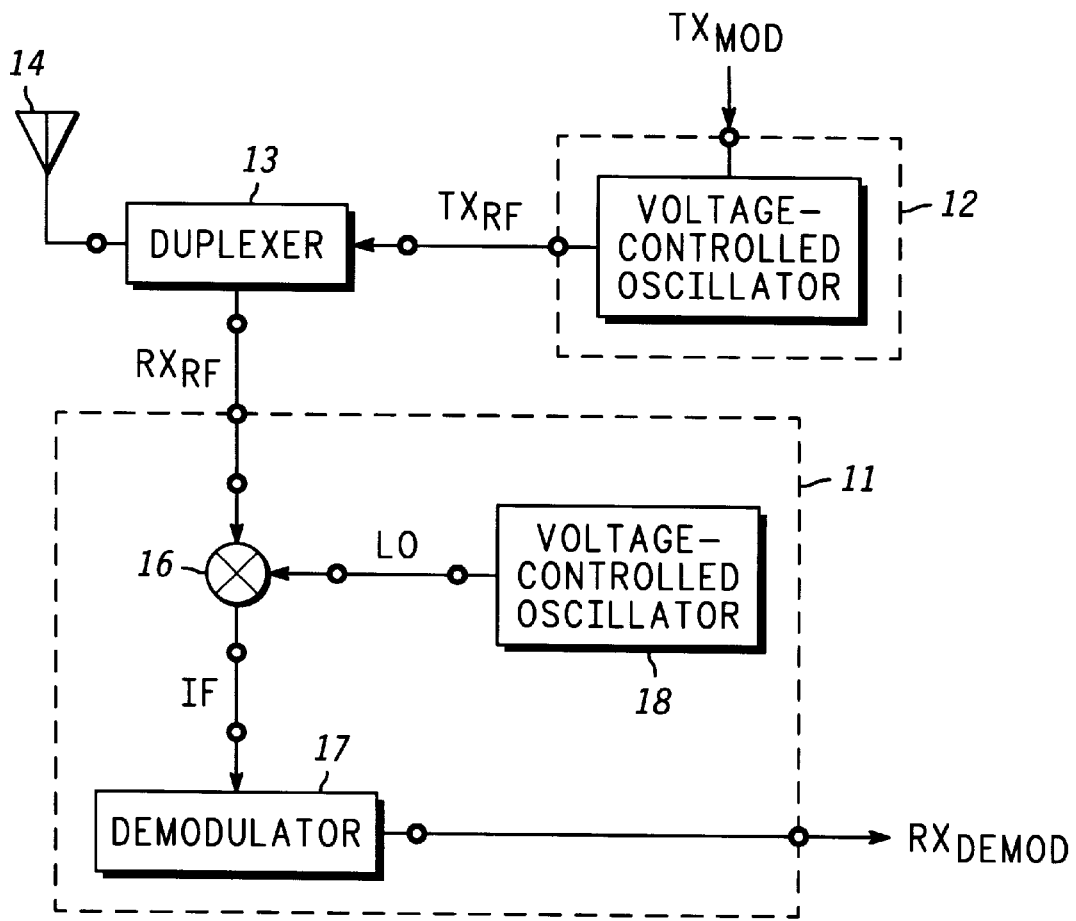
FIG. 1 is a block diagram of a prior art transceiver.

FIG. 1 is a block diagram of a prior art transceiver 10. It should be noted that arrowheads are shown in the figures to indicate signal direction. Transceiver 10 has a receiver portion 11, a transmitter portion 12, and a duplexer 13. Duplexer 13 has an Input/Output (I/O) terminal connected to an antenna 14, an input terminal for receiving a modulated RF signal labeled $TX_{RF}$, and an output terminal for providing a modulated RF signal labeled $RX_{RF}$. Receiver portion 11 has an input terminal connected to the output terminal of duplexer 13 and an output terminal for providing a demodulated receiver signal labeled $RX_{DEMOD}$. Receiver portion 11 is comprised of a mixer 16, a demodulator 17, and a Voltage-Controlled Oscillator (VCO) 18. Mixer 16 has a first input terminal coupled for receiving signal $RX_{RF}$, a second input terminal connected to the output terminal of VCO 18 for receiving an unmodulated local oscillator signal labeled LO, and an output terminal for providing an intermediate frequency signal labeled IF. Demodulator 17 has an input terminal connected to the output terminal of mixer 16 and an output terminal for providing signal $RX_{DEMOD}$.

Transmitter portion 12 has an input terminal for receiving a modulating signal labeled $TX_{MOD}$ and an output terminal connected to the input terminal of duplexer 13 for providing signal $TX_{RF}$. In this embodiment, transmitter portion 12 is comprised of a VCO. In other embodiments, transmitter portion 12 can be comprised of other elements such as filters, phase detectors, etc.

In operation, duplexer 13 provides modulated signal $RX_{RF}$ in response to a modulated RF signal (not shown) being received by antenna 14. The spectrum of signal $RX_{RF}$, which contains modulated information, is centered at a frequency of, for example, 900 megahertz (MHz). Signal $TX_{RF}$ is transmitted to antenna 14 via duplexer 13. As is well known, duplexer 13 is a device which isolates signals $TX_{RF}$ and $RX_{RF}$ while permitting them to share a common antenna, i.e., antenna 14. Modulated signal $TX_{RF}$ is generated by VCO 12. The spectrum of $TX_{RF}$ is centered at a frequency of, for example, 910 MHz and is generated by modulating a reference signal (not shown) using modulating signal $TX_{MOD}$.

Referring to receiver portion 11, VCO 18 generates unmodulated signal LO. It should be noted that signal LO is a pure tone signal. Mixer 16 multiplies modulated signal $RX_{RF}$ with unmodulated signal LO to generate signal IF. Demodulator 17 demodulates signal IF to generate signal $RX_{DEMOD}$.

It should be noted that prior art transceiver 10 uses two oscillators 12 and 18 for receiving and transmitting modulated RF signals.

Figure 2:
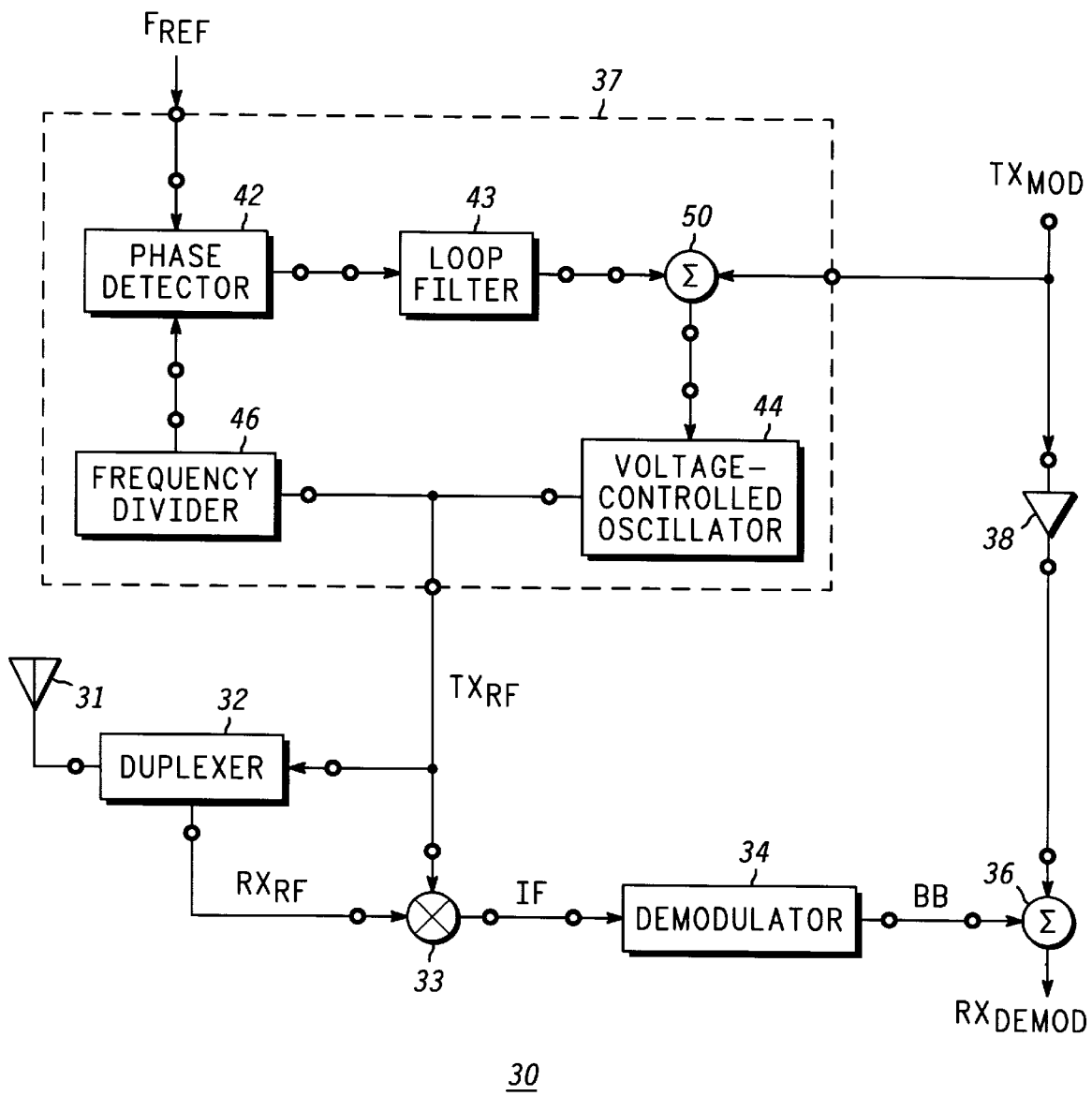
FIG. 2 is a block diagram of a circuit for receiving and transmitting modulated Radio Frequency (RF) signals in accordance with an embodiment of the present invention.

FIG. 2 is a block diagram of a circuit 30 for receiving and transmitting modulated RF signals in accordance with an embodiment of the present invention. Circuit 30 is a transceiver that includes a duplexer 32, a mixer 33, a demodulator 34, a summing device 36, a synthesizer 37, and an equalizer 38. Duplexer 32 has an I/O terminal connected to an antenna 31, an input terminal for receiving a modulated transmitter RF signal labeled $TX_{RF}$, and an output terminal for providing a modulated receiver RF signal labeled $RX_{RF}$. Mixer 33 has a first input terminal coupled for receiving signal $RX_{RF}$, a second input terminal coupled for receiving signal $TX_{RF}$, and an output terminal for providing a modulated intermediate frequency signal labeled IF.

Demodulator 34 has an input terminal connected to the output terminal of mixer 33 and an output terminal for providing a demodulated baseband signal labeled BB. Summing device 36 has a first input terminal connected to the output terminal of demodulator 34, a second input terminal, and an output terminal for providing a demodulated receiver signal labeled $RX_{DEMOD}$. Equalizer 38 has an input terminal for receiving a modulating signal labeled $TX_{MOD}$ and an output terminal connected to the second input terminal of summing device 36.

Synthesizer 37 has a first input terminal for receiving a reference signal labeled $F_{REF}$, a second input terminal connected to the input terminal of equalizer 38, and an output terminal commonly connected to the input terminal of duplexer 32 and to the second input terminal of mixer 33. It should be noted that although the output terminal of mixer 33 is described as being coupled to the first input terminal of summing device 36 via demodulator 34, this is not a limitation of the present invention. Depending on the application, demodulator 34 may be omitted and the output terminal of mixer 33 can be connected to the first input terminal of summing device 36. When demodulator 34 is omitted, signal $TX_{MOD}$ may be a modulated signal instead of a modulating signal.

By way of example, synthesizer 37 is a Phase-Locked Loop (PLL) device having a phase detector 42, a loop filter 43, a summing device 50, a Voltage-Controlled Oscillator (VCO) 44, and a frequency divider 46. Phase detector 42 has a reference input terminal connected to the first input terminal of synthesizer 37, a feedback input terminal connected to the output terminal of frequency divider 46, and an output terminal connected to the input terminal of loop filter 43. Summing device 50 has a first input terminal connected to the output terminal of loop filter 43, a second input terminal connected to the second input terminal of synthesizer 37, and an output terminal. VCO 44 has an input terminal connected to the output terminal of summing device 50 and an output terminal commonly connected to the output terminal of synthesizer 37 and to the input terminal of frequency divider 46. It should be noted that transceiver 30 has one synthesizer, i.e., synthesizer 37, which has one oscillator, i.e., VCO 44, for receiving and transmitting modulated RF signals.

In operation, duplexer 32 provides modulated signal $RX_{RF}$ in response to a modulated RF signal (not shown) received by antenna 31. The spectrum of signal $RX_{RF}$, which contains modulated information, is centered at a frequency of, for example, 900 megahertz (MHz). Signal $TX_{RF}$ is transmitted to antenna 14 via duplexer 32. Modulated signal $TX_{RF}$ is generated by synthesizer 37. The spectrum of $TX_{RF}$ is centered at a frequency of, for example, 910 MHz and is generated by modulating a reference signal $F_{REF}$ using modulating signal $TX_{MOD}$. $TX_{MOD}$ is, for example, a 1.5 kilohertz (kHz) sinusoidal signal.

In this embodiment, synthesizer 37 is a PLL device for generating modulated signal $TX_{RF}$ using modulating signal $TX_{MOD}$. PLL device 37 maintains a constant phase angle between signals $F_{REF}$ and $TX_{RF}$ and also serves as a frequency detector so that the carrier frequency of signal $TX_{RF}$ is proportional to the frequency of signal $F_{REF}$. Phase detector 42 receives signal $F_{REF}$ and a loop clock signal (not shown) from frequency divider 46. Further, phase detector 42 provides a phase detect output signal (not shown) that indicates the phase difference between the loop clock signal and signal $F_{REF}$. Phase detector 42 provides the phase detect output signal to the input terminal of loop filter 43, which in turn provides a filtered signal (not shown) to summing device 50. The filtered signal indicates the phase difference between signal $F_{REF}$ and an output signal of frequency divider 46. Summing device 50 combines the filtered signal with modulating signal $TX_{MOD}$ to generate a combined signal (not shown) which is transmitted to VCO 44. In response to the combined signal, VCO 44 provides modulated signal $TX_{RF}$ having a desired frequency. Signal $TX_{RF}$ is divided by frequency divider 46 to provide the loop clock signal.

It should be understood that the method for generating signal $TX_{RF}$ is not limited to the configuration shown for synthesizer 37. In another embodiment, summing device 50 is omitted and signal $TX_{MOD}$ is transmitted to frequency divider 46. In yet another embodiment, summing device 50 is not located between loop filter 43 and VCO 44, but between phase detector 42 and loop filter 43. In this embodiment, signal $TX_{MOD}$ is combined with the output signal of phase detector 42 and the combined signal is transmitted to the input terminal of loop filter 43.

The spectrum of modulated signal $RX_{RF}$ is translated from a frequency of 900 MHz to a frequency of, for example, 10 MHz by mixing modulated signals $RX_{RF}$ and $TX_{RF}$ to generate modulated signal IF. In particular, mixer 33 multiplies modulated signal $RX_{RF}$ with modulated signal $TX_{RF}$ and generates modulated signal IF having its spectrum centered at 10 MHz. The modulation of signal IF results from combining modulated signal $RX_{RF}$ with modulated signal $TX_{RF}$ during the mixing of signals $RX_{RF}$ and $TX_{RF}$. Thus, the spectrum of the received modulated signal, i.e., signal $RX_{RF}$, is translated using the transmitter modulated signal, i.e., signal $TX_{RF}$.

Demodulator 34 demodulates signal IF and generates demodulated signal BB. Signal BB has a demodulated component which represents the modulation of signal $RX_{RF}$ and a demodulated component which represents the modulation of signal $TX_{RF}$. In order to remove the demodulated component which represents the modulation of signal $TX_{RF}$ from signal BB, signal BB is combined with modulating signal $TX_{MOD}$ using summing device 36. Depending on the application, summing device 36 either subtracts signal $TX_{MOD}$ from signal BB or adds signal $TX_{MOD}$ to signal BB to remove the modulation of signal $TX_{RF}$ from signal BB. Further, summing device 36 generates demodulated signal $RX_{DEMOD}$ which has a demodulated component that represents the modulation of signal $RX_{RF}$.

Equalizer 38 adjusts the amplitude and phase of a signal over a desired frequency bandwidth. In this embodiment, equalizer 38 is used to delay the transmission of modulating signal $TX_{MOD}$ to summing device 36 in order to compensate for the time delay introduced by synthesizer 37, mixer 33, and demodulator 34. Although transceiver 30 is described as having equalizer 38, this is not a limitation of the present invention. It should be understood that equalizer 38 is an optional element of transceiver 30.

By now it should be appreciated that a transceiver is provided that uses a single oscillator for receiving and transmitting RF signals. An advantage of the present invention is that the transceiver can be monolithically integrated into a semiconductor material to form a single chip transceiver having a single oscillator. Another advantage of the present invention is that it is smaller in size and reduces the amount of power consumed during normal operation compared to transceivers that have two oscillators.

What is claimed is:

1. A circuit for receiving and transmitting Radio Frequency (RF) signals, comprising:

a mixer having a first input terminal, a second input terminal, and an output terminal;

a synthesizer having a first input terminal, a second input terminal, and an output terminal coupled to the second input terminal of the mixer; and a first summing device having a first input terminal coupled to the output terminal of the mixer, a second input terminal coupled to the second input terminal of the synthesizer, and an output terminal, wherein the synthesizer comprises:

a phase detector having a first input terminal coupled to the first input terminal of the synthesizer, a second input terminal, and an output terminal;

a loop filter having an input terminal coupled to the output terminal of the phase detector and an output terminal;

a second summing device having a first input terminal coupled to the output terminal of the loop filter, a second input terminal coupled to the second input terminal of the synthesizer, and an output terminal; and an oscillator having an input terminal coupled to the output terminal of the second summing device and an output terminal coupled to the output terminal of the synthesizer and to the second input terminal of the phase detector.

2. The circuit of claim 1, further comprising a demodulator, wherein the output terminal of the mixer is coupled to the first input terminal of the first summing device via the demodulator.

3. The circuit of claim 1, further comprising a duplexer having an Input/Output (I/O) terminal, an input terminal coupled to the output terminal of the synthesizer, and an output terminal coupled to the first input terminal of the mixer.

4. The circuit of claim 3, further including an antenna coupled to the I/O terminal of the duplexer.

5. The circuit of claim 1, further comprising an equalizer, wherein the second input terminal of the synthesizer is coupled to the second input terminal of the first summing device via the equalizer.

* * * * *